(No Model.)
B. L. HORN.
HAND CORN PLANTER.
No. 250,540. Patented Dec. 6, 1881.
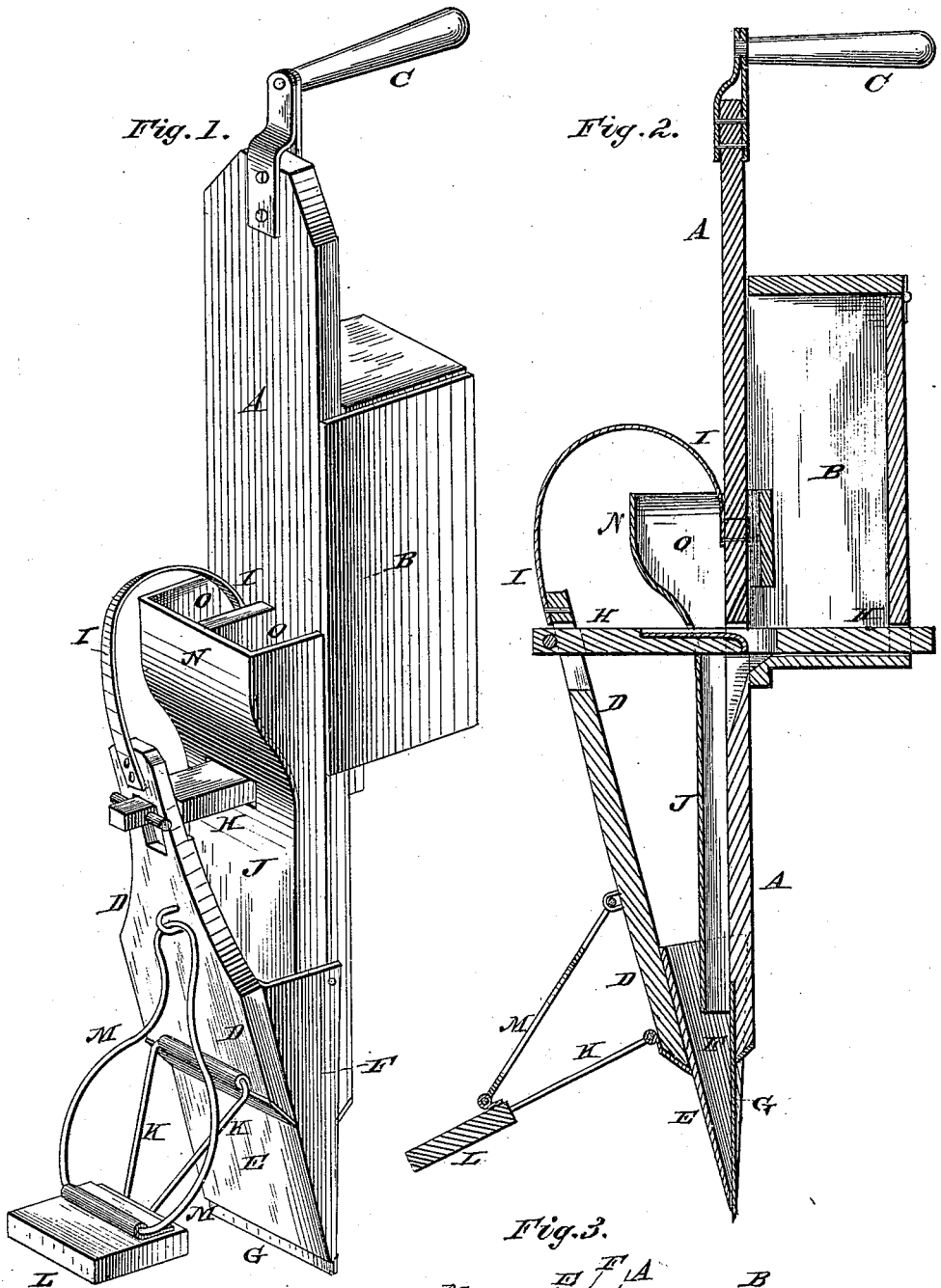
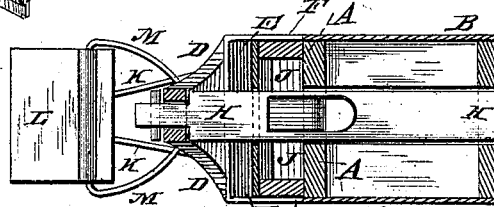
WITNESSES
INVENTOR
Attorneys.

UNITED STATES PATENT OFFICE.

BYRON L. HORN, OF HIMROD'S, NEW YORK.

HAND CORN-PLANTER.

SPECIFICATION forming part of Letters Patent No. 250,540, dated December 6, 1881.

Application filed August 11, 1881. (No model.)

*To all whom it may concern:*

Be it known that I, BYRON L. HORN, of Himrod's, in the county of Yates and State of New York, have invented certain new and useful Improvements in Hand Corn-Planters; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved hand corn-planter. Fig. 2 is a vertical sectional view of the same, and Fig. 3 is a horizontal sectional view taken through the seed-slide.

Corresponding parts in the several figures are denoted by like letters of reference.

This invention relates to hand corn-planters; and it consists in certain improvements in the construction of the same, which will be hereinafter fully described, and particularly pointed out in the claim.

In the drawings hereto annexed, A represents the leg of my improved corn-planter, which is provided near its upper end with a hopper, B, to receive the seed-corn. A suitable handle, C, is also provided at the upper end of leg A.

D is an arm or lever, the lower end of which is provided with a blade, E, having flanges F, by means of which the said lever is pivoted to the lower end of leg A, as shown. The said leg is provided at its lower end with a blade, G, fitting nicely between the flanges F of blade E. The upper end of the lever D is keyed, hinged, or otherwise jointed to the outer end of the seed-slide H, which is constructed in any suitable well-known manner, and which slides horizontally in the bottom of the seed-box, it being forced automatically in an outward direction by a suitably-arranged spring, I.

The seed-tube J is formed upon the outside of leg A, so as to conduct the seed down between the blades E G.

The lower end of the lever D is provided with a hinged arm, K, carrying at its outer end a flat horizontal plate, L, which is connected by an elliptical or other suitable spring, M, with a point of the said lever located above the hinge of arm K.

The upper end of the seed-tube J may be widened, as shown at N, so as to form a chamber, O, in which pumpkin or other seed may be placed, so as to be planted simultaneously with the corn.

The operation and advantages of this invention will be readily understood. The machine is to be grasped by the handle and the blades E G forced or pressed into the ground until the plate L strikes the surface of the soil. By continuing the downward pressure the lever D is then forced inward, so as to separate the blades, and at the same time operate the seed-slide, thus causing the seed to drop into the opening prepared by the blades. When the planter is raised or withdrawn from the ground the spring I automatically forces the lever D back to its original position.

Having thus described my invention, I claim and desire to secure by Letters Patent of the United States—

As an improvement in hand corn-planters, the leg A, having seed-box B, blade G, and seed-tube J, widened at its upper end, so as to form an auxiliary seed-chamber, O, the lever D, having flanged blade E, hinged arm K, carrying plate L, and the elliptical spring M, the seed-slide H, hinged at the upper end of lever D, and the bow-spring I, all combined and operating as and for the purpose herein set forth.

In testimony that I claim the foregoing as my own I have hereto affixed my signature in presence of two witnesses.

BYRON L. HORN.

Witnesses:
GARRETT S. AYRES,
NELSON JONES.